US012449879B2

(12) United States Patent
Stormont et al.

(10) Patent No.: US 12,449,879 B2
(45) Date of Patent: Oct. 21, 2025

(54) SYSTEMS AND METHODS FOR TRACKING AND CONTROLLING ENERGY CONSUMPTION IN FLEETS OF ELECTRONIC DEVICES

(71) Applicant: ZEBRA TECHNOLOGIES CORPORATION, Lincolnshire, IL (US)

(72) Inventors: Brian C. Stormont, Uxbridge, MA (US); Sriram Krishnan, Sharon, MA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 156 days.

(21) Appl. No.: 17/977,620

(22) Filed: Oct. 31, 2022

(65) Prior Publication Data

US 2024/0143058 A1  May 2, 2024

(51) Int. Cl.
*G06F 1/3206* (2019.01)
*G06F 9/445* (2018.01)

(52) U.S. Cl.
CPC ........ *G06F 1/3206* (2013.01); *G06F 9/44505* (2013.01)

(58) Field of Classification Search
CPC .... G06F 1/3203; G06F 1/3206; G06F 1/3234; G06F 1/32; G06F 9/44505
See application file for complete search history.

(56) References Cited

U.S. PATENT DOCUMENTS

| | | | | |
|---|---|---|---|---|
| 9,116,897 B2* | 8/2015 | Rowan | ................ | G06F 11/3006 |
| 10,368,313 B2* | 7/2019 | Lippman | ............... | H02J 7/0048 |
| 2011/0106326 A1* | 5/2011 | Anunobi | ................ | G06Q 10/04 |
| | | | | 700/291 |
| 2012/0053925 A1* | 3/2012 | Geffin | .................. | H05K 7/1498 |
| | | | | 703/21 |
| 2016/0370843 A1* | 12/2016 | Gatson | ................. | G06F 1/3206 |

* cited by examiner

*Primary Examiner* — Brian T Misiura

(57) ABSTRACT

A method in a server includes: storing, in a memory of the server, an energy consumption definition corresponding to a client device, the energy consumption definition including: (i) a plurality of operational states of the client device, and (ii) an estimation mechanism for each operational state; receiving, from the client device, operational data including an active one of the operational states at the client device, and a time period associated with the active operational state; generating, based on the operational data and the estimation mechanism corresponding to the active operational state, an estimated energy consumption for the client device; in response to generating the estimated energy consumption, obtaining an updated configuration setting for the client device; and transmitting the updated configuration setting to the client device to alter energy consumption at the client device.

22 Claims, 6 Drawing Sheets

SYSTEMS AND METHODS FOR TRACKING AND CONTROLLING ENERGY CONSUMPTION IN FLEETS OF ELECTRONIC DEVICES

BACKGROUND

Various environments, including transport and logistics facilities, manufacturing facilities, office environments, and the like, can include a wide variety of electronic devices such as printers, mobile computers, barcode scanners, and the like. Such devices are electrically powered, and therefore may contribute to the carbon footprints of the facilities in which the devices are deployed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
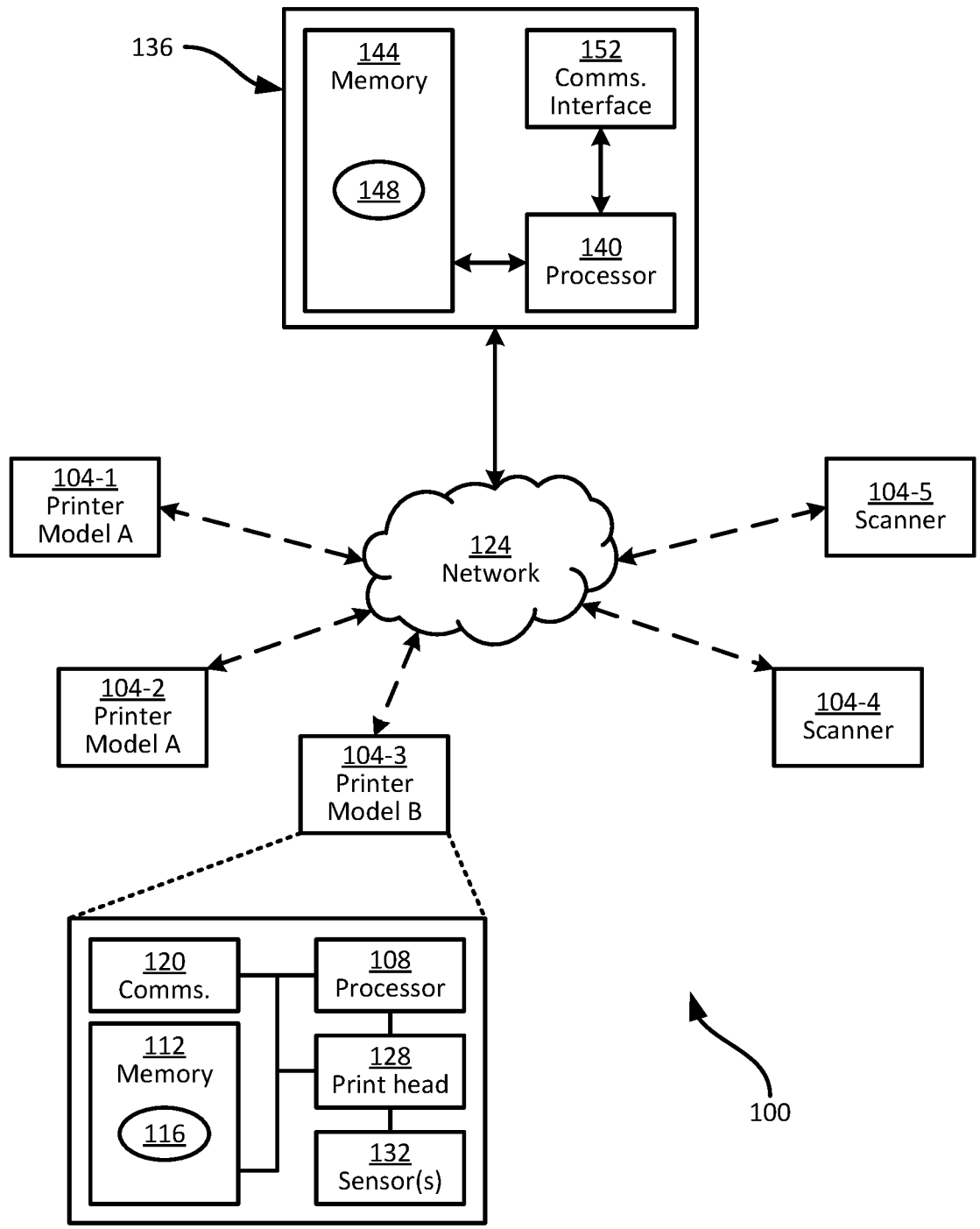
FIG. 1 is a diagram of a system for tracking and controlling energy consumption in fleets of electronic devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a server, the method including: storing, in a memory of the server, an energy consumption definition corresponding to a client device, the energy consumption definition including: (i) a plurality of operational states of the client device, and (ii) an estimation mechanism for each operational state; receiving, from the client device, operational data including an active one of the operational states at the client device, and a time period associated with the active operational state; generating, based on the operational data and the estimation mechanism corresponding to the active operational state, an estimated energy consumption for the client device; in response to generating the estimated energy consumption, obtaining an updated configuration setting for the client device; and transmitting the updated configuration setting to the client device to alter energy consumption at the client device.

Additional examples disclosed herein are directed to a server, including: memory storing an energy consumption definition corresponding to a client device, the energy consumption definition including: (i) a plurality of operational states of the client device, and (ii) an estimation mechanism for each operational state; and a processor configured to: receive, from the client device, operational data including an active one of the operational states at the client device, and a time period associated with the active operational state; generate, based on the operational data and the estimation mechanism corresponding to the active operational state, an estimated energy consumption for the client device; in response to generating the estimated energy consumption, obtain an updated configuration setting for the client device; and transmit the updated configuration setting to the client device to alter energy consumption at the client device.

FIG. 1 illustrates a system 100 for tracking and controlling energy consumption in fleets of electronic devices, also referred to herein as client devices. The system 100 can be employed to track and control energy consumption in a wide variety of client devices, certain examples of which are shown in FIG. 1. In particular, the system 100 as illustrated includes client devices 104-1 and 104-2, which in this example are printers of a first model "A" (e.g., battery-powered desktop label printers, although the system 100 can also include a wide variety of other printer types). The system 100 also includes a client device 104-3, which in this example is a printer of a second model "B" (e.g., a mains-powered desktop label printer, without a battery-based power supply), and client devices 104-4 and 104-5, which in this example are barcode scanners (e.g., handheld barcode scanners). The client devices 104-1 to 104-5 may also be referred to below collectively as the client devices 104, and generically as a client device 104 (similar nomenclature may also be used herein for other numbered elements).

The system 100 can include various other types of client devices 104, including mobile computers (e.g., tablet computers, smartphones, or the like), data capture devices such as scanners or cameras, and the like. The client devices 104 can be deployed in shared physical facilities, such as a warehouse or other transport and logistics facility, a healthcare facility, or the like. The client devices 104 can also, however, be deployed across multiple physically distinct facilities.

Certain example components of the client device 104-3 are also illustrated. For example, the client device 104-3 can include a processor 108 such as a central processing unit (CPU), field-programmable gate array (FPGA) or other suitable control circuit, connected with a non-transitory storage medium such as a memory 112. The memory 112 can store an application 116 executable by the processor 108 to perform various functions, e.g., related to the production of labels. The processor 108 can also be connected with a communications interface 120, enabling the device 104-3 to communicate with other computing devices, e.g., via a network 124. The processor 108 can also be connected with a print head 128, e.g., including a plurality of controllable thermal elements for applying heat to media (for direct thermal printers) to release pigment embedded in the media (e.g., labels), or for applying heat to a pigment-carrying ribbon to cause transfer of the pigment to the media (for thermal transfer printers). The processor 108 is further connected with one or more sensors 132, such as optical sensors for monitoring the movement of media within the printer, and the like.

As will be apparent, the device 104-3 can include a wide variety of other components in addition to those illustrated, such as motors, a display, an input device (e.g., a touch screen), and the like. The other client devices 104 can also include a wide variety of internal components, and need not include the same internal components as the device 104-3. The internal components of each client device 104 can include any of a variety of suitable assemblies, such as components or collections of components with associated functions. For example, the print head 128 is a first assembly of the client device 104-3. A media transport assembly of the client device 104-3 can include one or more motors configured to draw media past the print head 128.

As will be apparent, the client devices 104 are electrically powered, and during operation may draw electrical power from onboard batteries and/or from mains power sources. The power draw of any given client device 104 may vary over time, depending on the operational state of the client device 104. For example, the client device 104-3 may consume more power during a print operation (e.g., to print a label) than when idle, because during the print operation, assemblies such as the print head 128 are active, but in an idle state, such assemblies are not powered, or are in low-power modes. Further, the power consumed by the client device 104-3 during print operations may vary between print operations, based on the informational content of the labels, because fewer or greater numbers of the thermal elements of the print head 128 may be powered for different lengths of time based on label content.

More generally, therefore, the client devices 104 can consume varying amounts of energy over time, based on the activities of the client devices 104. The number of the client devices 104, the disparate location(s) in which the devices 104 may be deployed, and the variability in energy consumption over time at each device 104 may complicate accurate monitoring of the carbon footprint of the fleet of client devices 104 (e.g., which may be assessed by measuring the total energy consumed by the fleet over a given time period).

The system 100 therefore also includes a server 136, in communication with the devices 104 via the network 124, configured to collect operational data from the client devices 104 and generate energy consumption estimates for the client devices 104 based on the collected data. As discussed below, the server 136 can store definitions corresponding to the client devices 104 for generating the estimates under various conditions (e.g., for various models of client device 104, each of which may provide different set of operational data). The server 136 can also, in some examples, obtain and transmit updated configuration settings to the client devices 104, e.g., to optimize energy consumption at the client devices 104 while mitigating the performance impact of such optimizations.

The server 136 includes a processor 140 (e.g. a CPU, graphics processing unit (GPU), or combination thereof), interconnected with a non-transitory computer readable storage medium, such as a memory 144. The memory 144 includes a suitable combination of volatile memory (e.g. Random Access Memory or RAM) and non-volatile memory (e.g. read only memory or ROM, Electrically Erasable Programmable Read Only Memory or EEPROM, flash memory). The processor 140 and the memory 144 each comprise one or more integrated circuits. The memory 144 stores computer readable instructions executable by the processor 140 to perform various functionality to exchange configuration data with the client devices 104. In particular, the memory 144 stores a client monitoring application 148 executable by the processor 140 to perform various actions discussed herein. The application 148 can be integrated, in some examples, with other fleet management functions performed by the server 136, such as updating print settings, collecting status data, and the like.

The server 136 also includes a communications interface 152 interconnected with the processor 140. The communications interface 152 includes suitable hardware (e.g. transmitters, receivers, network interface controllers and the like) allowing the server 136 to communicate with other computing devices, including the client devices 104.

Figure 2:
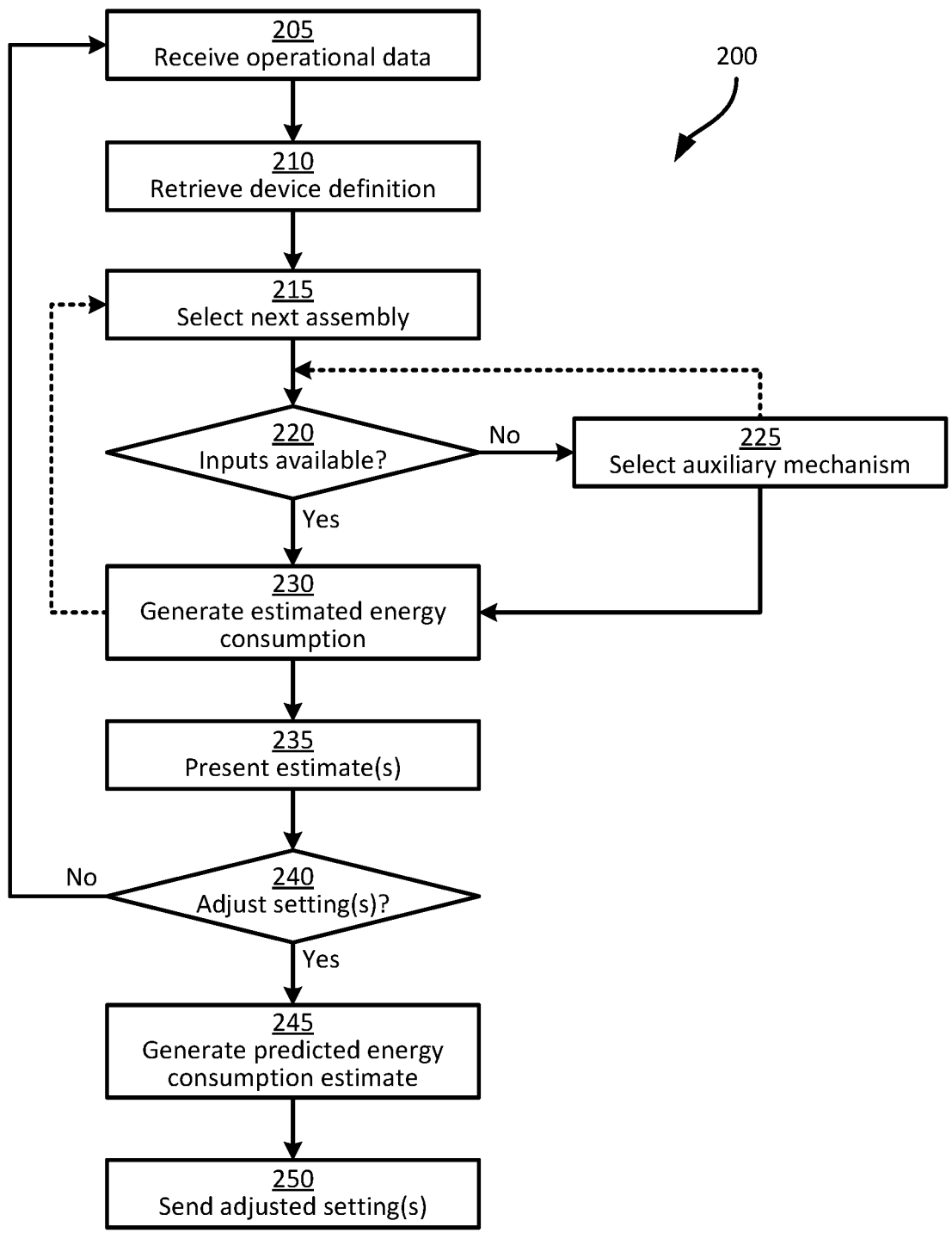
FIG. 2 is a flowchart of a method of tracking and controlling energy consumption in fleets of electronic devices.

Turning to FIG. 2, a method 200 of tracking and controlling energy consumption in fleets of electronic devices is illustrated. The method 200 is described below in conjunction with an example performance of the method 200 within the system 100. In particular, the blocks of the method 200 in this example are performed by the server 136.

At block 205, the server 136 is configured to receive operational data from one or more of the client devices 104. Each client device 104 can be configured, for example, to transmit operational data to the server 136 via the network 124. Operational data can be transmitted by each client device 104 periodically according to a predetermined schedule (e.g., daily, although a wide variety of other frequencies can also be employed) in some implementations. In other implementations, the client devices 104 can transmit operational data substantially in real time, e.g., defining events at the client devices 104 as those events occur. In further implementations, the server 136 can be configured to request operational data from the client devices prior to block 205.

The operational data received at block 205 from a given client device 104 includes at least an indication of an active operational state at that client device 104, and a time period associate with the active operational state. The operational data can include active operational states and time periods for each of the assemblies of the device 104, in some examples. Each assembly of a client device 104 has a plurality of operational states, and is in one of those states, referred to as the active operational state, at any given time. Each operational state can define a type of activity performed by the assembly. For example, the print head 128 can have operational states including a disabled state (e.g., when the print head 128 is powered off), a startup state (e.g., when the print head 128 is warming up upon being powered on), an active state (e.g., when the print head 128 is actively applying pigment to a label or other media), and an idle state (e.g., when the print head 128 is powered on and warmed up, but not currently printing). A wide variety of other operational states can also be employed, and each assembly need not have the same set of operational states (although the sets of operational states between assemblies can overlap).

The operational data received at block 205 can also include configuration settings at the client devices 104, and/or task-specific data. For example, the client devices 104 can be configured to transmit to the server 136 a wide variety of configuration settings such as time thresholds for entering sleep states, network connectivity parameters (e.g., connected local-area networks), device identifiers, display brightness settings, and the like. Other examples of configuration settings, e.g., in the case of printers, include print head width and/or resolution, print speed settings, and the like.

Task-specific data can include, for example, values for attributes defining a print job, in the case of the client devices 104-1, 104-2, and 104-3. Examples of task-specific data can therefore include a number of labels printed, a proportion of the label(s) that are pigmented (e.g., black) relative to the total area of the label(s), user interface events at the devices 104 (e.g., activations of buttons or other inputs on the devices 104), and so on.

A wide variety of other task-specific operational data can also be provided to the server 136 by the client devices 104, and thus received by the server 136 at block 205, including CPU utilization levels, memory usage measurements, packets and/or volume of data sent and received, and the like. Further, the operational data can include measured energy consumption levels for a given operational state. For example, battery-powered devices 104 such as the devices 104-1 and 104-2 may report, along with an active operational state and associated time period, a measured energy consumption in the active operational state over the time period. The measured energy consumption need not be expressed in units of energy (e.g., Joules), but can instead be conveyed as measurements from which energy consumption can be derived, such as current draw and the like.

Figure 3:
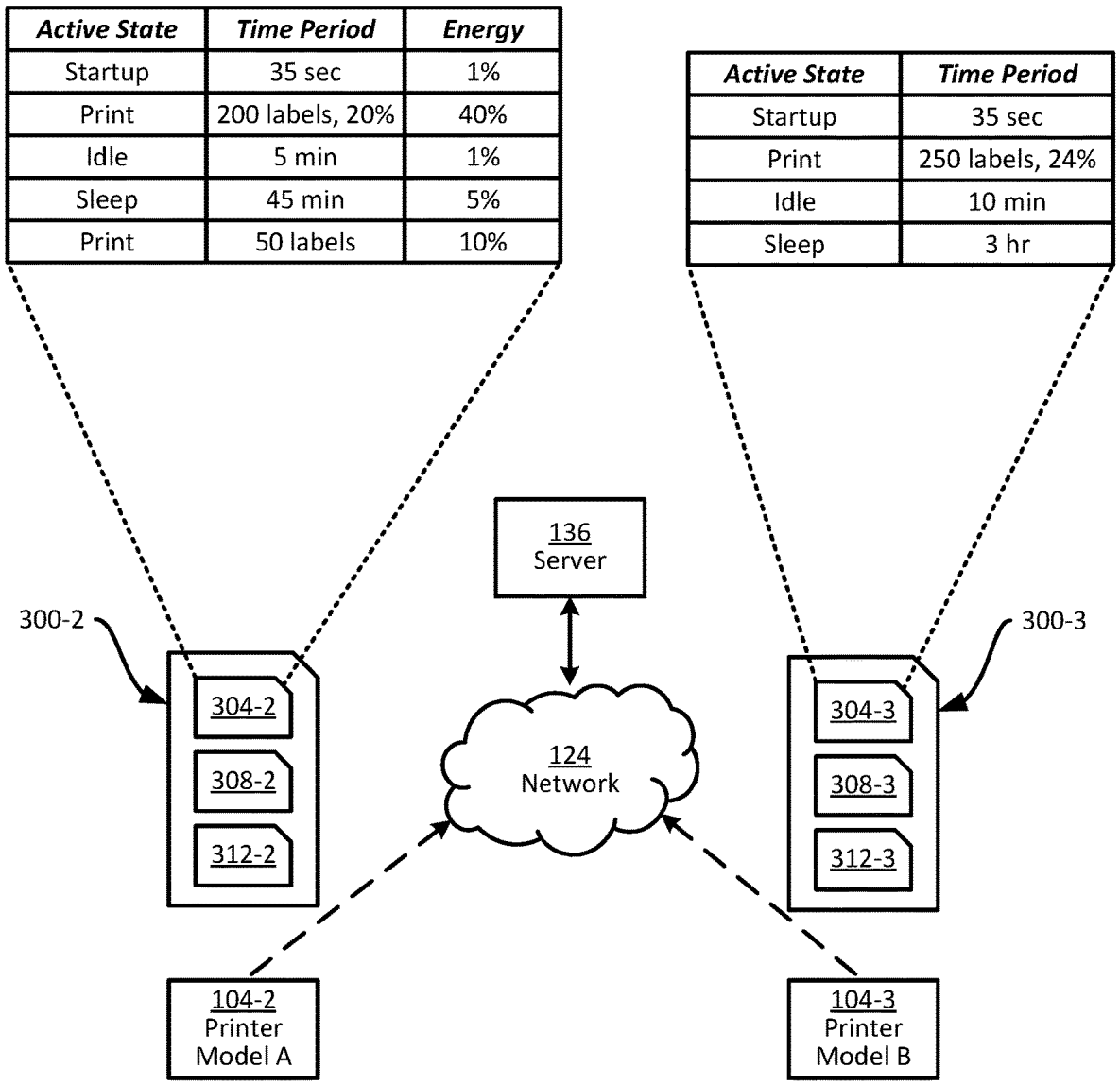
FIG. 3 is a diagram illustrating an example performance of block 205 of the method of FIG. 2.

Turning to FIG. 3, a portion of the system 100 is shown (omitting the client devices 104-1, 104-4, and 104-5), with each of the client devices 104-2 and 104-3 sending operational data to the server 136. In particular, the client device 104-2 is shown transmitting operational data 300-2 to the server 136, and the client device 104-3 is shown transmitting operational data 300-3 to the server 136. It will be understood that the operational data 300-2 need not be transmitted simultaneously with the operational data 300-3. Each set of operational data 300 includes operational data for more than one assembly of the corresponding client device 104. Thus, for example, the operational data 300-2 includes a set 304-2 for the print head 128, a set 308-2 for the communications interface 120, and a set 312-2 for the sensor assembly 132. Similarly, the sensor data 300-3 includes sets 304-3, 308-3, and 312-3 corresponding to respective assemblies of the client device 104-3.

As will be apparent, the operational data 300-2 and 300-3 can include sets of data for additional assemblies, or fewer assemblies, depending on the nature of the client devices 104. The sets 304-2 and 304-3 are illustrated in greater detail. As shown in FIG. 3, the set 304-2 includes a sequence of active operational states, including a startup state, a printing state, an idle state, and a sleep state. The data defining the time period in each state can be arranged in the sequence in which the states occurred (as illustrated), and/or can include timestamps or the like indicating events initiating and/or terminating each state. As also illustrated, the set 304-2 includes a time period associated with each active state, which can include an absolute time period in seconds, minutes, hours, or the like, or a relative time period, e.g., defined by a number of labels printed. The set 304-2 can also include, e.g., in association with the label count, a proportion of the labels produced that was pigmented (as opposed to whitespace), e.g., expressed as a percentage.

In addition, the set 304-2 includes measured energy consumption, e.g., expressed in battery charge level, in each active operational state. The set 304-3, in contrast, includes active operational states and associated time periods, but does not include energy consumption measurements (e.g., because the client device 104-3 is not battery powered, and may not include a power-measurement mechanism). As noted earlier, the operational data can also include various other configuration-related and/or task-related data. For example, the operational data can include data sets for other assemblies, such as the communications interface 120 (e.g., indicating which operational states are active from among idle, receiving, and transmitting states or the like), a display of a printer 104, mobile computer or the like, e.g., indicating which operational states are active from among a sleep state, and an active state (e.g., with a specific brightness indicated).

Returning to FIG. 2, at block 210 the processor 140 is configured to retrieve a device definition, e.g., from the memory 144. The device definition, which can also be referred to as an energy consumption definition, is a set of data defining energy consumption estimation mechanisms for a type of client device 104, or in some cases for multiple types of client device 104.

Figure 4:
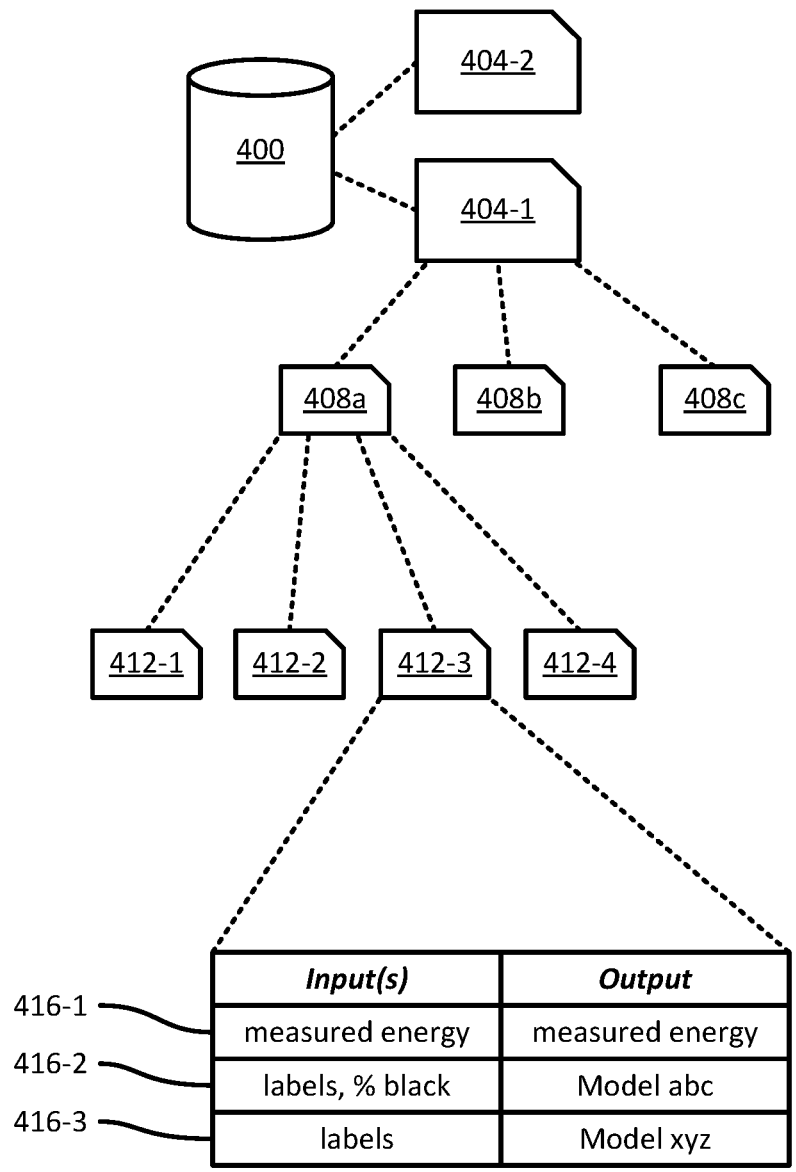
FIG. 4 is a diagram illustrating an example device definition used in the method of FIG. 2.

Turning to FIG. 4, an example structure of a device definition is illustrated. The server 136 may maintain, e.g., in the memory 144, a repository 400 of device definitions. In the illustrated example, the repository 400 includes a first definition 404-1, corresponding to two types of client device 104, namely the model "A" printers and the model "B" printers, and a second definition 404-2 corresponding to another type of client device 104, namely the barcode scanners 104-4 and 104-5. Certain features of the definition 404-1 are illustrated in greater detail. In particular, the definition 404-1 includes a plurality of assembly-specific datasets, e.g., 408*a*, 408*b*, and 408*c*, corresponding to distinct assemblies of the client devices 104-1, 104-2, and 104-3. For example, the dataset 408*a* can correspond to the print head 128. In turn, each of the datasets 408 includes estimation mechanisms for each of the operational states of the relevant assembly. Thus, for example, the dataset 408*a* contains sections 412-1, 412-2, 412-3, and 412-4 corresponding respectively to the startup, printing, idle, and sleep states mentioned earlier. The definition 404-1 further includes, for each operational state, at least one estimation mechanism used by the server 136 to generate an estimated energy consumption for the corresponding state and the corresponding assembly, based on the operational data from block 205.

For example, as shown in FIG. 4, the section 412-1 (e.g., corresponding to the printing state) defines three estimation mechanisms. The estimation mechanisms may be ranked or prioritized, such that the top mechanism is employed when the relevant inputs are available, and otherwise an auxiliary mechanism is employed. The definition 404-1 may therefore be applied to multiple types of client device 104 with at least some shared hardware elements, but with certain variations in their capabilities, examples of which are discussed further below.

The estimation mechanisms are each defined by one or more input indicators, and one or more output indicators. In the example of FIG. 4, the estimation mechanisms defined for the section 412-3 corresponding to the printing state of the print head 128 include a first estimation mechanism 416-1 that takes as an input attribute the measured energy consumed (e.g., as shown in FIG. 3), and generates as output that same measurement. In other examples, the output can include manipulating the input, for example to derive an amount of energy in Joules from a charge level percentage reported by the client device 104.

The section 412-3 also defines a first auxiliary estimation mechanism 416-2, in the form of an energy consumption model that accepts a number of labels printed and a pigmented (e.g., black) proportion (e.g., expressed as a percentage) of the total area of those labels as inputs. The output for the auxiliary mechanism 416-2 is generated via execution of a predetermined model "abc" that accepts the label count and pigmented proportion as inputs, and generates an energy consumption estimate as an output. The model can be a parametric equation, a series of such equations, a machine learning-based model such as a neural network, or the like. The model can also employ other inputs, either from the operational data or from data previously stored at the server 136, e.g., defining control parameters of the client device 104 (e.g., sleep times, black depth values for print heads, and the like).

In some cases, as shown in FIG. 4, more than one auxiliary estimation mechanism can be defined. As illustrated, the definition 404-1 also includes a second auxiliary estimation mechanism 416-3, in the form of a further model "xyz". The second auxiliary estimation mechanism can be, for example, a time-based estimation that accepts as input a duration (e.g., in the form of a label count) and outputs an estimated energy consumption based on a curved or other function measured previously for the relevant type of client device 104, e.g., by the manufacturer of the client device 104. As will now be apparent, the estimation mechanisms shown in FIG. 4 may decrease in accuracy from the mechanism 416-1 to the mechanism 416-3, but may also require fewer inputs from the mechanism 416-1 to the mechanism 416-3, enabling estimates to be generated for client devices with limited reporting capabilities.

Returning to FIG. 2, at block 215 the server 136 is configured to select the next assembly to process. That is, the server 136 selects, for a given device 104, operational data for a particular assembly (e.g., the data set 304-2 shown in FIG. 3), and the corresponding estimation mechanism from the relevant definition 404 (e.g., the mechanism 416-1 in the section 412-3 shown in FIG. 4). As will be evident in the discussion below, the selection at block 215, and some subsequent blocks of the method 200, can be repeated until an estimated energy consumption has been generated for each assembly of the client device 104.

At block 220, the server 136 is configured to determine whether the inputs specified in the selected estimation mechanism 416 are available in the operational data. In the present example, the determination at block 220 for the client device 104-2 is affirmative, because the client device 104-2 reports measured energy consumption. The determination at block 220 for the client device 104-3, however, is negative because the client device 104-3 does not report measured energy consumption.

Following a negative determination at block 220, the server 136 proceeds to block 225, and selects an auxiliary estimation mechanism such as the estimation mechanism 416-2. The server 136 then repeats the determination at block 220. In the event that the determination at block 220 is again negative, the next estimation mechanism (416-3) can be selected at block 225. In the present example, however, the determination at block 220 is affirmative for the client device 104-3 following selection of the estimation mechanism 416-2, because as seen in FIG. 3, although the client device 104-3 does not report measured energy consumption, the client device 104-3 does report label counts and pigmented proportions.

Following an affirmative determination at block 220, at block 230 the server 136 is configured to generate an estimated energy consumption based on the operational data from block 305 and the selected estimation mechanism. For example, in the case of the client device 104-2 the server 136 can simply use the measurements provided by the client device 104-2 itself. In other examples, the estimation mechanism 416-1 can specify a conversion process for generating an estimation, e.g., in Joules or other suitable units, from the measurements reported by the client device 104-2. In the case of the client device 104-3, the server 136 can execute the model "abc" noted earlier, providing the label count and pigmented proportion reported by the client device 104-3. When, as in the case of the data set 304-2, more than one period of activity in a given state is reported (e.g., two periods of time with the print state active), the server 136 can generate an estimate for each period, and sum the estimates.

The server 136 can repeat blocks 215, 220, and 230 (as well as block 225, as necessary based on the contents of the operational data from block 205) until energy consumption estimates have been generated for each assembly of the client device 104. The server 136 can then be configured to sum the estimates for each assembly, to produce an estimated energy consumption for the device 104 as a whole.

At block 235, the server 136 can be configured to present the estimate(s) generated via block 230, for one or more client devices 104. For example, the server 136 can host a web page or other user interface through which an operator can retrieve and view reports containing estimated energy consumption for one or more client devices 104. The client devices 104 for which data can be presented can be filtered, e.g., by device type, physical location (e.g., by facility), and the like. In some examples, the server 136 can store the assembly-specific estimates generated at block 230, and can therefore also present energy consumption for one or more specific assemblies of one or more client devices 104 (e.g., an interface displaying the energy consumption over time of the print heads 128 of the client devices 104-1, 104-2, and 104-3). In other examples, block 235 can be omitted, e.g., when the server 136 is configured to automatically generate and deploy adjustments to configuration settings to the client devices 104.

Figure 5:
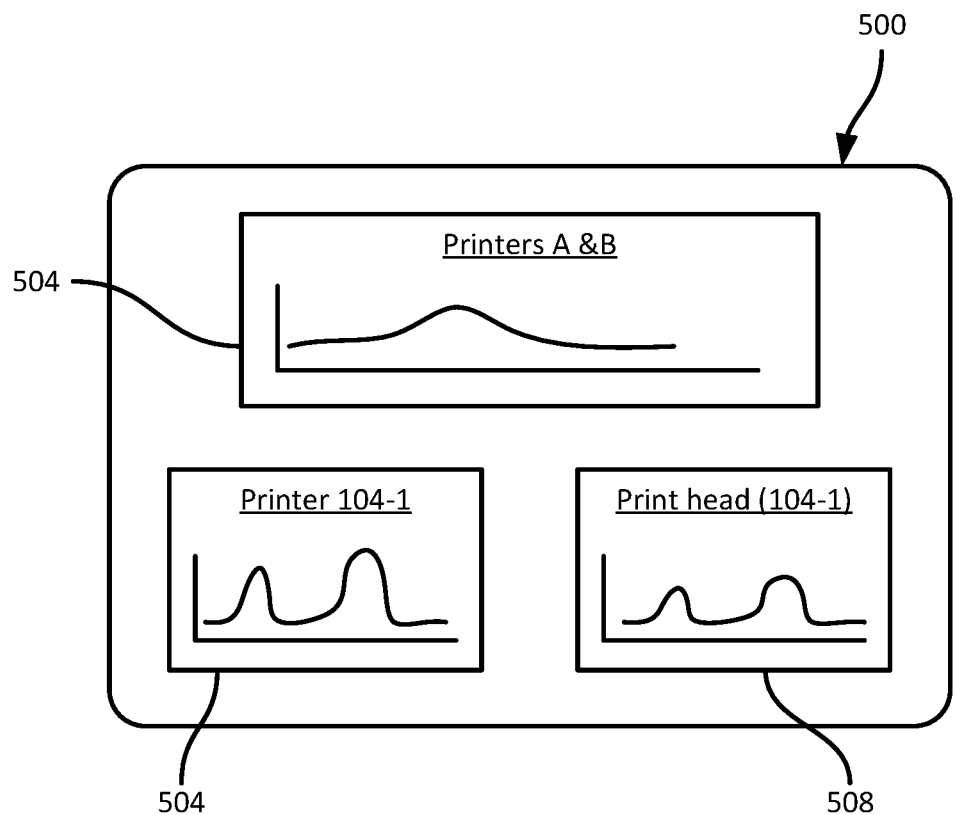
FIG. 5 is a diagram illustrating an example performance of block 235 of the method of FIG. 2.

For example, turning to FIG. 5, the server 136 can render reporting data on a display 500 (or transmit to another computing device that in turn controls the display 500). A wide variety of data can be selected for presentation on the display 500, for example including any or all of a plot 504 of energy consumed over time by the client devices 104-1, 104-2, and 104-3. The display 500 can also be controlled to present a plot 508 of energy consumed over time by the client device 104-1, and/or a plot 508 of energy consumed over time by the print head 128 of the client device 104-1. As will be apparent, the data presented on the display 500 can be filtered in various other ways, e.g., to view proportions of time spent by the client devices in each operational state, along with the energy consumed by the client devices 104 in each state.

Referring again to FIG. 2, at block 240, the server 136 is configured to determine whether to update any configuration settings of one or more client devices 104. The determination at block 240 can be based on, for example, whether input data is received from an operator including an updated configuration setting. For instance, an operator can retrieve configuration settings for a given client device 104 or set of client devices 104 (e.g., all model "A" printers), which are also stored at the server 136. The operator can provide input data altering a configuration setting, resulting in an affirmative determination at block 240. In other examples, the server 136 can generate an updated configuration setting automatically. For example, the server 136 can be configured to monitor various predetermined criteria, and store candidate settings updates to propose when such criteria are met.

For example, the server 136 can monitor the operational data from block 205 over time, and determine an average time spent in each active instance of the idle state for one or more client devices 104 (or for one or more assemblies of the client devices 104). When the average idle period falls below a threshold, or in some examples below a sleep setting (e.g., defining a time after which the client devices 104 will exit the idle state and enter the sleep state), the server 136 can generate a candidate update to the sleep setting, e.g., proposing a reduced sleep timer to lower power consumption at the client devices 104.

When the determination at block 240 is negative, the server 136 can return to block 205 and continue collecting operational data. Following the receipt or generation of a candidate setting update at block 240, the server proceeds to block 245. At block 245, the server 136 is configured to generate a predicted energy consumption estimate, based on the operational data and the updated setting. In other words, prior to applying the updated setting to any client devices 104, the server 136 is configured to generate, e.g., and present on the display 500, an assessment of the impact of the setting update on the energy consumption of affected client devices 104. To generate the predicted energy consumption estimate, the server 136 can be configured to retrieve operational data, e.g., over a preceding time period (e.g., one week) for a set of client devices 104, and to execute a model-based estimation mechanism (e.g., the model abc), substituting the updated configuration setting for the actual configuration setting. The resulting predicted energy consumption can be presented on an interface on the display 500.

Figure 6:
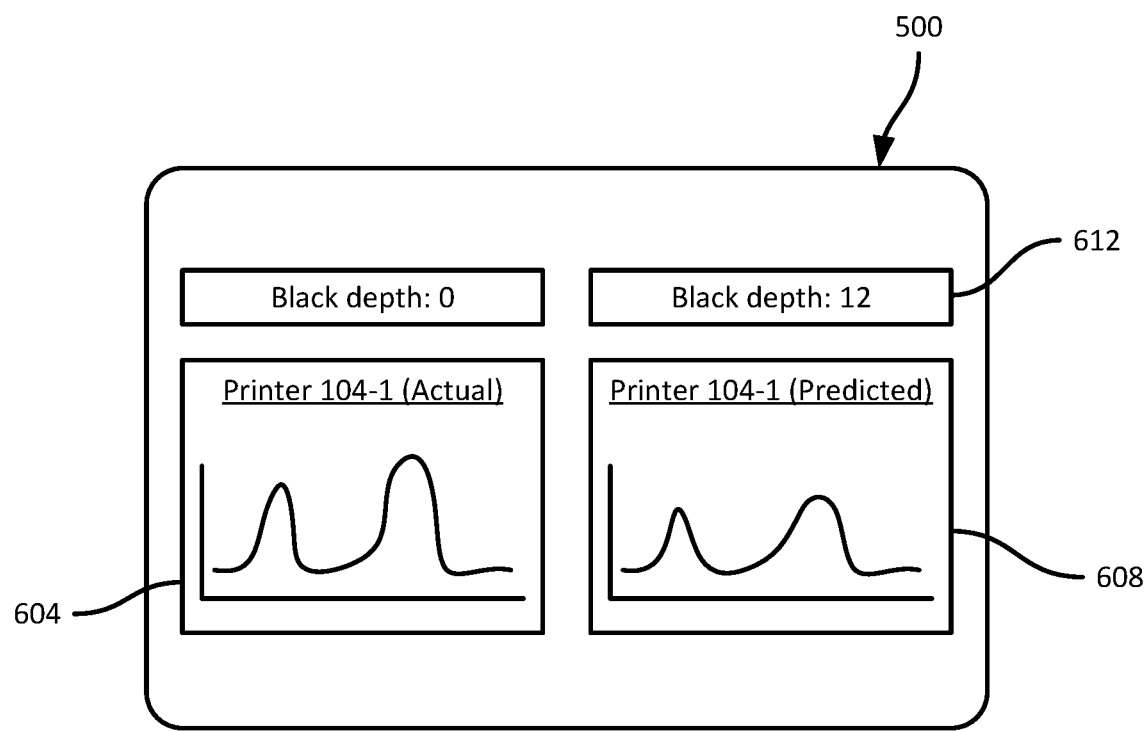
FIG. 6 is a diagram illustrating an example performance of block 245 of the method of FIG. 2.

A wide variety of configuration settings can be assessed as described above. For example, FIG. 6 illustrates a plot 604 of actual energy consumption for the client device 104-1, and a plot 608 of predicted energy consumption for the client device 104-1, following updating of a black depth configuration setting. The black depth configuration setting may, for example, define the darkest pigment applied to media by the print head 128. An updated black depth 612 corresponds to lighter blacks, which may impact the visual attributes of resulting labels or other media, but is also projected to reduce power consumption at the client device 104-1.

At block 250, the server 136 can be configured to transmit the updated configuration setting(s) to the relevant client devices 104, e.g., following receipt of a command from an operator approving the setting update. A variety of other configuration settings can also be updated as described above, including display brightness, sleep timers, and the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a server, the method comprising:
    storing, in a memory of the server, an energy consumption definition corresponding to a client device, the energy consumption definition including:
        (i) a plurality of operational states of the client device,
        (ii) a primary estimation mechanism configured to generate energy consumption estimates specific to each operational state of the client device, the client device including startup, active, idle, and sleep operational states,
        (iii) a first auxiliary estimation mechanism configured as a first fallback to estimate energy consumption when primary energy data is unavailable, utilizing alternative operational metrics, and
        (iv) a second auxiliary estimation mechanism configured as a second fallback to provide energy estimates when primary energy data and alternative operational metrics are unavailable,
    receiving, from the client device, operational data including an active one of the operational states at the client device, and a time period associated with the active operational state;
    selecting and executing one of the primary estimation mechanism, the first auxiliary mechanism, or the second auxiliary mechanism based on the availability of operational data;
    generating, based on the operational data and a selected one of the primary estimation mechanism, the first auxiliary estimation mechanism, or the second auxiliary estimation mechanism corresponding to the active operational state, an estimated energy consumption for the client device;
    in response to generating the estimated energy consumption, obtaining an updated configuration setting for the client device; and
    transmitting the updated configuration setting to the client device to alter energy consumption at the client device.

2. The method of claim 1, wherein the client device includes at least one of a printer, a mobile computer, or a barcode scanner.

3. The method of claim 2, wherein the client device includes a plurality of assemblies;
    wherein the energy consumption definition includes operational states and estimation mechanisms for each assembly;
    wherein the operational data includes active operational states for each assembly; and
    wherein generating the estimated energy consumption includes generating respective estimated energy consumption for each assembly.

4. The method of claim 1, wherein each estimation mechanism includes an input attribute, and an output generation function based on the input attribute.

5. The method of claim 1, wherein the first auxiliary estimation mechanism includes (i) an auxiliary input attribute, and (ii) an auxiliary output generation function; and
    wherein the method comprises, responsive to receiving the operational data:
        determining whether the operational data includes a value for an input attribute; and when the operational data does not include a value for the input attribute, generating the estimated energy consumption based on an auxiliary value corresponding to the auxiliary input attribute.

6. The method of claim 4, wherein the input attribute includes a measured energy consumption determined at the client device.

7. The method of claim 4, wherein the input attribute includes a control parameter of the client device, and wherein the output generation function includes an energy consumption model based on the control parameter.

8. The method of claim 4, wherein the alternative operational metrics include label counts and pigmented proportions.

9. The method of claim 1, further comprising storing a plurality of energy consumption definitions corresponding to respective types of client devices.

10. The method of claim 1, wherein obtaining the updated configuration setting includes:
    receiving a candidate configuration setting via an input device; and
    generating a predicted energy consumption based on the candidate configuration setting, the operational data, and the estimation mechanism.

11. The method of claim 1, wherein obtaining the updated configuration setting includes: automatically selecting the updated configuration setting.

12. A server, comprising:
    a memory storing an energy consumption definition corresponding to a client device, the energy consumption definition including:
        (i) a plurality of operational states of the client device,
        (ii) a primary estimation mechanism configured to generate energy consumption estimates specific to each operational state of the client device, the client device including startup, active, idle, and sleep operational states,
        (iii) a first auxiliary estimation mechanism configured as a first fallback to estimate energy consumption when primary energy data is unavailable, utilizing alternative operational metrics, and
        (iv) a second auxiliary estimation mechanism configured as a second fallback to provide energy estimates when primary energy data and alternative operational metrics are unavailable; and
    a processor configured to:
        receive, from the client device, operational data including an active one of the operational states at the client device, and a time period associated with the active operational state;
        select and execute one of the primary estimation mechanism, the first auxiliary mechanism, or the second auxiliary mechanism based on the availability of operational data;
        generate, based on the operational data and a selected one of the primary estimation mechanism, the first auxiliary estimation mechanism, or the second auxiliary estimation mechanism corresponding to the active operational state, an estimated energy consumption for the client device;

in response to generating the estimated energy consumption, obtain an updated configuration setting for the client device; and transmit the updated configuration setting to the client device to alter energy consumption at the client device.

13. The server of claim 12, wherein the client device includes at least one of a printer, a mobile computer, or a barcode scanner.

14. The server of claim 13, wherein the client device includes a plurality of assemblies;
wherein the energy consumption definition includes operational states and estimation mechanisms for each assembly;
wherein the operational data includes active operational states for each assembly; and
wherein the processor is configured to generate the estimated energy consumption by generating respective estimated energy consumption for each assembly.

15. The server of claim 12, wherein each estimation mechanism includes an input attribute, and an output generation function based on the input attribute.

16. The server of claim 12, wherein the first auxiliary estimation mechanism includes (i) an auxiliary input attribute, and (ii) an auxiliary output generation function; and
wherein the processor is configured, responsive to receiving the operational data, to:
determine whether the operational data includes a value for an input attribute; and when the operational data does not include a value for the input attribute, generate the estimated energy consumption based on an auxiliary value corresponding to the auxiliary input attribute.

17. The server of claim 15, wherein the input attribute includes a measured energy consumption determined at the client device.

18. The server of claim 15, wherein the input attribute includes a control parameter of the client device, and wherein the output generation function includes an energy consumption model based on the control parameter.

19. The server of claim 15, wherein the alternative operational metrics include label counts and pigmented proportions.

20. The server of claim 12, wherein the memory stores a plurality of energy consumption definitions corresponding to respective types of client devices.

21. The server of claim 12, wherein the processor is configured to obtain the updated configuration setting by:
receiving a candidate configuration setting via an input device; and
generating a predicted energy consumption based on the candidate configuration setting, the operational data, and the estimation mechanism.

22. The server of claim 12, wherein the processor is configured to obtain the updated configuration setting by: automatically selecting the updated configuration setting.

* * * * *